March 27, 1951 C. C. S. LE CLAIR 2,546,672

NIPPLE OR LUBRICANT-RECEIVING DEVICE

Filed July 10, 1948 5 Sheets-Sheet 1

Inventor:
Camille Clare Sprankling Le Clair
By Hinkle, Horton, Ahlberg, Hansmann & Wupper
Attorneys.

March 27, 1951 C. C. S. LE CLAIR 2,546,672

NIPPLE OR LUBRICANT-RECEIVING DEVICE

Filed July 10, 1948 5 Sheets-Sheet 2

Inventor:
Camille Clare Sprankling Le Clair
By Hinkle, Horton, Chilton, Hunnamann & Whipple
Attorneys.

NIPPLE OR LUBRICANT-RECEIVING DEVICE

Filed July 10, 1948 5 Sheets-Sheet 3

Inventor:
Camille Clare Sprankling Le Clair
By Hinkle, Horton, Ahlberg, Hansmann & Hupper
Attorneys.

NIPPLE OR LUBRICANT-RECEIVING DEVICE

Inventor:
Camille Clare Sprankling Le Clair
By Hinkle, Horton, Ahlberg, Hansmann & Wupper
Attorneys.

March 27, 1951 C. C. S. LE CLAIR 2,546,672

NIPPLE OR LUBRICANT-RECEIVING DEVICE

Filed July 10, 1948 5 Sheets-Sheet 5

Inventor:
Camille Clare Sprankling Le Clair
By Hinkle, Horton, Gilberg, Hinsmann & Weaver
Attorneys.

Patented Mar. 27, 1951

2,546,672

UNITED STATES PATENT OFFICE 2,546,672

NIPPLE OR LUBRICANT-RECEIVING DEVICE

Camille Clare Sprankling Le Clair, Acton, London, England, assignor to Tecalemit Limited, Brentford, England, a corporation of Great Britain Application July 10, 1948, Serial No. 37,994
In Great Britain July 25, 1947

17 Claims. (Cl. 184—105)

This invention relates in general to nipples or lubricant-receiving devices (hereinafter called "nipples") for use in lubrication systems with grease guns, or equivalent, nozzles and which are so constructed that dirt cannot collect in their lubricant-receiving passages.

The object of the invention is to provide resilient closure members or teats which are provided with normally-closed lubricant passages of small size of no measurable diameter or width and which are so constructed that by thrust applied to them by the nozzles of grease guns the inlet ends of the said passages may be pulled open initially, so as to permit of the entry of lubricant injector devices which form parts of the nozzles of grease guns and through which lubricant may be injected under pressure into the said passages and thence to the places of use of the lubricant.

Resilient closure members or teats according to this invention thus have the advantage that their outer surfaces, which inevitably are dirt-laden, are pulled away from the mouths of the said lubricant passages so that the said injector devices enter clean surfaces and do not (as in known types of nipples), push dirt into those passages.

According to this invention, there is provided a resilient lubricant-impervious closure member or teat which is adapted to act either as a closure for the inlet end of a lubricant supply passage formed in a rigid nipple or which itself forms a complete nipple which is adapted to act as a closure for the inlet end of a lubricant supply passage formed in or leading to a bearing or other place of use, the said closure member or teat including a body part comprising a shank which is adapted to be fixed in the said lubricant supply passage, a nozzle-engaging head, and a lubricant passage which, or the inlet end of which, is in the form of a hole of no measurable diameter or one or more slits of no measurable width such that there is no exposed aperture in which dirt can collect, the said head being so formed that pressure applied by the nozzle of a grease gun to its outer surface at a position spaced laterally from the inlet end of the said lubricant passage through the closure member or teat causes the head to be distorted or deflected in such a manner that the inlet end of the said passage is opened or spread initially to allow the entry of an injector device, whereby lubricant under pressure fed into the injector device may be forced through the passage to a place of use.

According to a further feature of the invention, there is provided a resilient, lubricant-impervious closure member or teat which is adapted to act either as a closure for the inlet end of a lubricant supply passage formed in a rigid nipple having a body part including an external laterally-projecting flange part or which itself forms a complete nipple which is adapted to act as a closure for the inlet end of a lubricant supply passage formed in a bearing or other place of use, the said closure member or teat including a body part comprising a shank which is adapted to be fixed in the said lubricant supply passage, a nozzle-engaging head, and a lubricant passage in the form of a hole of no measurable diameter or one or more slits of no measurable width such that there is no exposed aperture in which dirt can collect, the said nozzle-engaging head being spaced at such a distance from the part of the said shank, which is fixed in the said lubricant supply passage in the nipple body part when the closure member or teat is in its working position in the said lubricant supply passage, that when the closure member or teat is in the said position the inner surface of the nozzle-engaging head is spaced outwardly away from the outer surface of the said laterally-projecting flange or the outer surface of the said bearing or other place of use, the arrangement being such that pressure, applied by the nozzle of a grease gun to the outer surface of the said nozzle-engaging head around, and at a position spaced laterally from, the inlet end of the said lubricant passage in the closure member or teat, causes the head to be distorted or deflected in such a manner that the inlet end of the said lubricant passage is opened or spread initially to allow the entry of an injector device, whereby lubricant under pressure fed into the injector device may be forced through the lubricant passage.

As will appear hereinafter, the nipple may comprise a metal or other rigid body part and a flexible and resilient closure member or teat or the resilient closure member may itself constitute the nipple, in which latter case the member will act as a closure member for a lubricant supply passage formed in, or associated with, the part to be lubricated. In either case, the said closure member or teat may be made of rubber, synthetic rubber, or other mouldable, lubricant-impervious and resilient material.

The above mentioned shank may include anchoring means consisting of a flange which is adapted to be fitted in a counterbored portion of the said lubricant supply passage, and a neck part, which is of less diameter than the flange and connects the said flange to the said nozzle-engaging head and is adapted to be fitted in the lubricant passage in the closure member or teat between the said counterbored portion and the inlet end of the lubricant supply passage.

On the other hand, the said nozzle-engaging head may be integral with a neck part which is of less diameter than the head and is recessed at its end remote from the latter so as to provide a shank of reduced diameter which is made a press fit in or is bonded into the inlet end of the said lubricant supply passage, and a shoulder which rests upon the outer surface of the said laterally-projecting flange or of the bearing or other part to be lubricated.

The closure member or teat may consist of a solid member formed with a straight-through, axial lubricant passage in the form of a hole or one or more slits normally of no measurable diameter or width.

As an alternative, however, the closure member or teat may be formed with a central recess or bore of measurable diameter which communicates with the said lubricant passage in the nipple body or in the part to be lubricated and which is of such a depth that a comparatively thin wall is left between the outer surface of the said nozzle-engaging head and the near end of the said recess, and wherein a lubricant passage of no measurable diameter or width is formed in the said wall and provides communication between the outer surface of the said head and the said recess.

A number of constructional forms of the invention are shown, by way of example, in the accompanying drawings, wherein.

Figure 1:
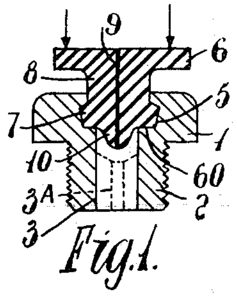
Figure 1 is a sectional view of a nipple which comprises a rigid body part and a resilient closure member or teat formed with a straight-through lubricant passage of no measurable diameter, a deformable nozzle engaging head and an anchoring flange.
Figure 36:
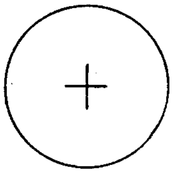
Figure 37:
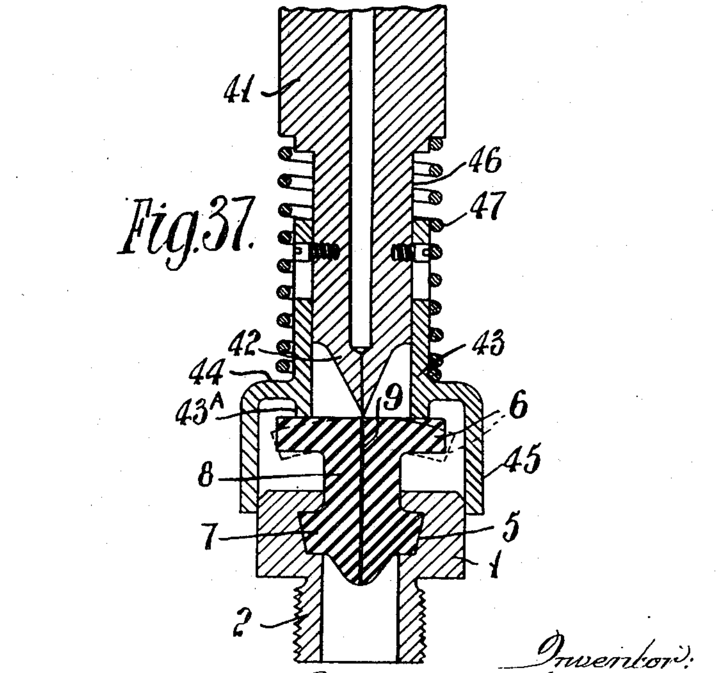
Figure 37 is a sectional view of part of the nozzle of a grease gun shown in its working position upon a nipple as shown in Figure 1, such a nozzle, however, being adapted for use with any of the nipples shown in Figures 1 to 32 and 34 to 36.
Figure 38:
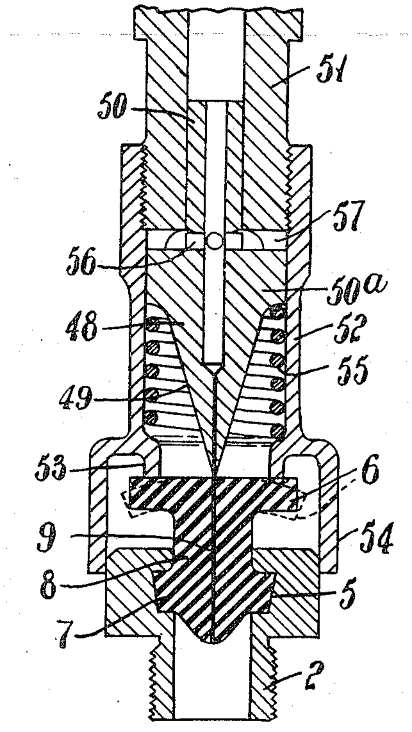
Figure 39:
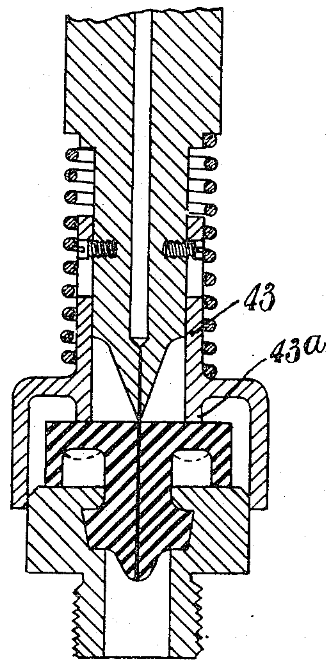

Figure 38 is a sectional view of part of a modified nozzle which is also shown in its working position upon a nipple as shown in Figure 1 and which is also adapted for use with any of the nipples shown in Figures 1 to 32 and 34 to 36; and Figure 39 is a sectional view of part of the nozzle of a grease gun of the same type as that shown in Figure 37 in its working position upon a nipple of the type shown in Figures 9 to 16 and 25 to 32.

Referring to Figure 1:

The nipple comprises a metallic or other rigid body part having an external laterally-projecting flange or head 1, which may be shaped for engagement by a spanner, and a shank 2 which is threaded externally to screw into a threaded hole on the bearing or other member upon which the nipple is to be mounted. The nipple body part is formed with a straight-through bore 3 which is counterbored for a short distance from the face of the flange 1 to form a parallel bore 4 and again counterbored to a conical section 5 between the bottom of the parallel counterbore and the rest of the straight-through nipple bore. The conical counterbore 5 has an inner flat shoulder 60. As shown by the broken lines, the bore 3 in the nipple body may be terminated at, say, about half the total height of the body and connected to the base of the shank 2 by a smaller bore 3A.

The nipple also comprises a lubricant-imperious closure member or teat of resilient material, such as rubber, or synthetic rubber, which comprises a nozzle-engaging head or flange 6 and an anchoring flange 7 which is spaced from the head by a neck part 8 which is of less diameter than the anchoring flange. When the teat is mounted in the nipple body the anchoring flange is fitted in the said conical counterbore 5 and the neck part 8 is fitted in, and projects upwards out of, the parallel counterbore 4 which extends inwards from the upper surface of the nipple body head 1, the underside of the teat head 6 being spaced some distance above the said surface. The teat is provided with a central straight-through passage 9 in the form of a hole of no measurable diameter which is normally closed, and below the inner face of its anchoring flange it may be provided with a downwardly projecting conical or rounded pip 10.

The anchoring flange 7 of the teat is preferably of slightly larger size than the conical counterbore 5, in order to ensure a tight fit, the resiliency of the material permitting it to be forced into position in the latter, the conical formation assisting this operation.

Figure 2:
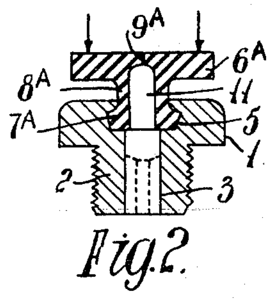
Figure 2 is a sectional view of a nipple which is similar to that shown in Figure 1 but in which the closure member or teat is hollow and is formed at its inlet end with a short lubricant passage of no measurable diameter.

As shown in Figure 2, in a second construction, the nipple body part may be constructed as described above. The teat also may comprise an anchoring flange 7A, a neck 8A and an outer head 6A as described above but in this case it includes a central recess 11 which extends upwards from the bottom of the anchoring flange 7A to a position short of the top surface of the head. A small central hole 9A which is of no measurable diameter and is normally closed is provided through the thin material lying between the top surface of the teat head and the near or adjacent end of the said recess 11 in the teat.

Figure 3:
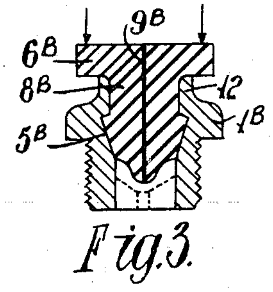
Figure 3 is a sectional view of a nipple which is similar to that shown in Figure 1 but in which the nipple body part is formed with a collar upon which the head of the closure member or teat is partly supported.

In a third construction, which is shown in Figure 3, the teat is constructed like that shown in Figure 1 but there is no shoulder at the bottom of the conical recess 5B. The nipple body head 1B has an upwardly-extending sleeve or collar 12 which fits around the teat neck 8B and against the underside of the teat head 6B, thus forming a partial support for the latter against the thrust of the grease gun. The teat is provided with a central straight-through hole 9B of no measurable diameter.

Figure 4:
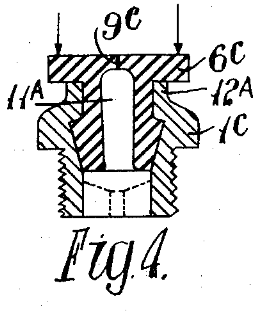
Figure 4 is a sectional view of a nipple which is similar to that shown in Figure 3 but in which the closure member or teat is hollow and has a short passage at the inlet end of no measurable size.

Referring to Figure 4, in a fourth construction, the nipple body part and the teat head 6C are constructed like those in the construction shown in Figure 3, except that the teat has a central recess 11A and a small hole 9C of no measurable diameter connecting the latter to the top surface of the head 6C as in the construction shown in Figure 2. The underside of the head 6C fits against the end of the sleeve 12A.

Figure 5:
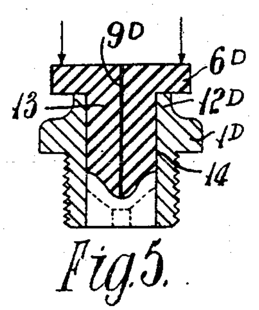
Figure 5 is a sectional view of a nipple which is similar to that shown in Figure 3 but in which the closure member or teat is fixed in the nipple body part by press-fitting or bonding instead of by an anchoring flange.

In a fifth construction, which is shown in Figure 5, the nipple body part is constructed externally like that of the constructions shown in Figures 3 and 4 but under its nozzle-engaging head 6D the teat has a plain cylindrical shank 13 which is press-fitted or bonded into a plain cylindrical straight-through bore 14 in the nipple body. The underside of the head 6D fits against the end of the sleeve 12D. The teat is provided with a central straight-through hole 9D of no measurable diameter.

Figure 6:
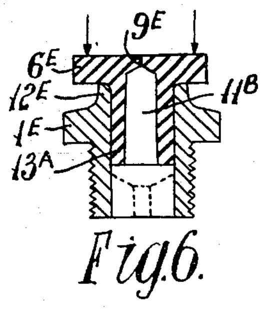
Figure 6 is a sectional view of a nipple which is similar to that shown in Figure 5, but in which the closure member or teat is hollow.

Referring to Figure 6, in a sixth construction, the nipple body part and the teat are constructed like those shown in Figure 5, but the teat has a central recess 11B and a small hole 9E connecting the latter to the top surface of the head 6E as in the constructions shown in Figures 2 and 4. The underside of the teat head 6E fits against the end of the sleeve 12E.

Figure 7:
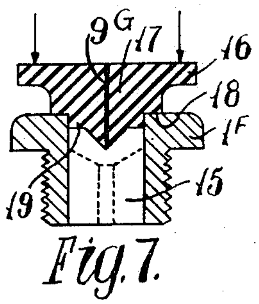
Figure 7 is a sectional view of a nipple which comprises a rigid body part and a resilient closure member or teat comprising a head, cylindrical body which is shaped to provide a spigot adapted to be press-fitted or bonded in the nipple body part and a straight-through lubricant passage of no measurable diameter.
Figure 8:
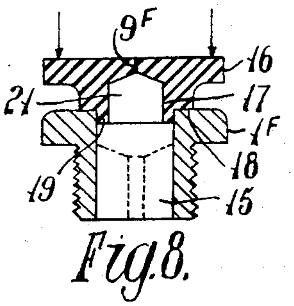
Figure 8 is a sectional view of a nipple which is similar to that which is shown in Figure 7 but which is hollow and formed with a short lubricant passage of no measurable diameter at the inlet end.
Figure 9:
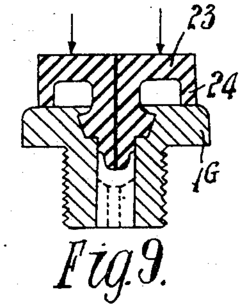
Figures 9 to 16 are sectional views of modified nipples which are similar respectively to the nipples shown in Figures 1 to 8, but in each of which the resilient closure member or teat is supported at its peripheral edge by a peripheral flange which rests upon the head of the nipple body part.
Figure 10:
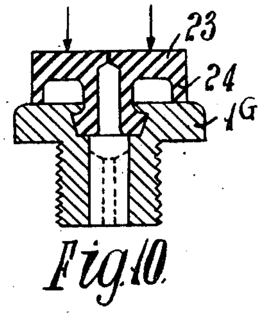
Figure 11:
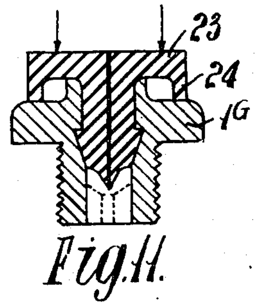
Figure 12:
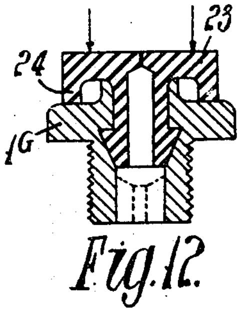
Figure 13:
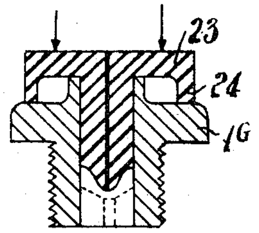
Figure 14:
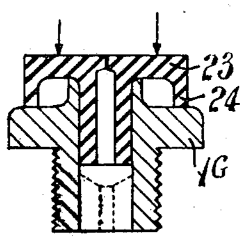
Figure 15:
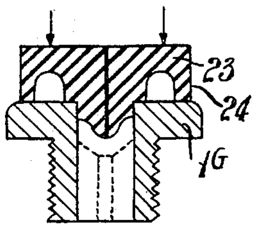
Figure 16:
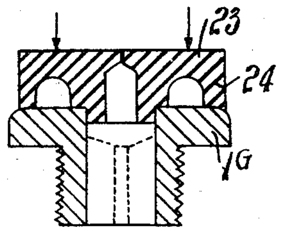
Figure 17:
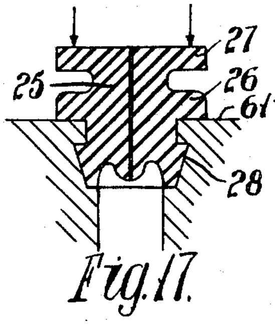
Figures 17 to 24 are sectional views of resilient closures or teats which themselves form complete nipples adapted to be applied to bearings or other places of use, each of these nipples comprising an intermediate external flange which is supported upon the bearing or other place of use.
Figure 18:
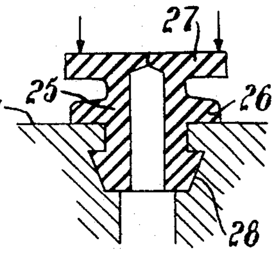
Figure 19:
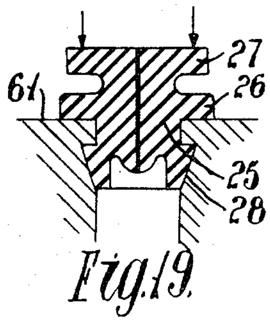
Figure 20:
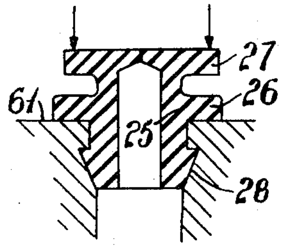
Figure 21:
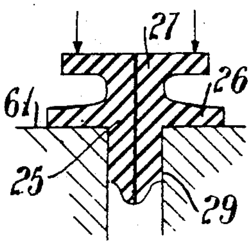
Figure 22:
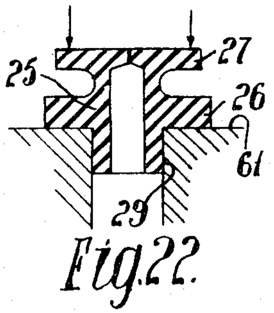
Figure 23:
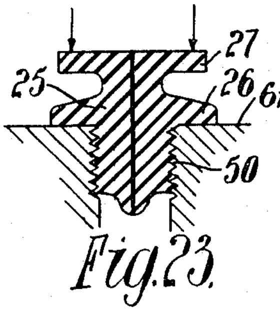
Figure 24:
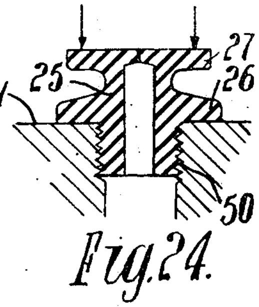
Figure 25:
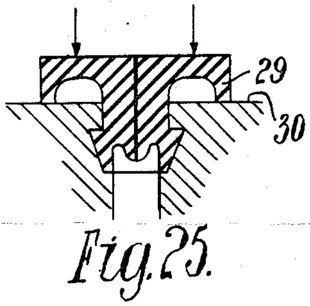
Figures 25 to 32 are sectional views of resilient closure members or teats which themselves form complete nipples adapted to be applied to bearings or other places of use, each of these nipples being supported at its peripheral edge by a peripheral flange which rests upon the bearing or other place of use.
Figure 26:
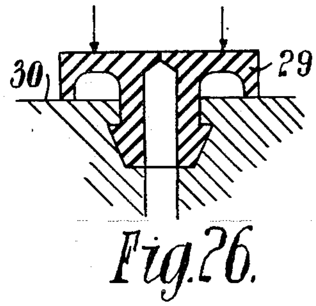
Figure 27:
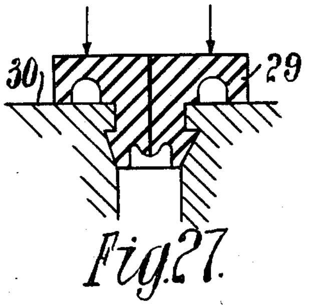
Figure 28:
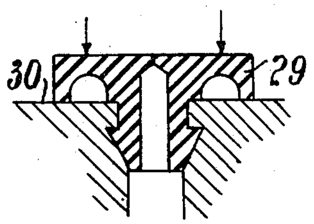
Figure 29:
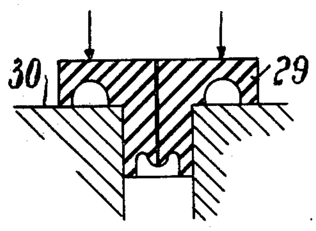
Figure 30:
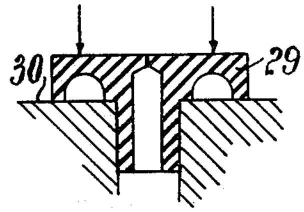
Figure 31:
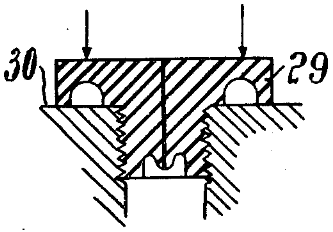
Figure 32:
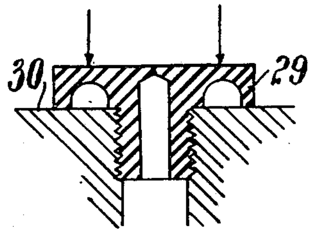

In both the seventh and eighth constructions, which are shown in Figures 7 and 8, the nipple body part has a plain cylindrical straight-through bore 15 and the teat has a nozzle-engaging head 16, a cylindrical body 17 and a reduced portion extending from its base upwards so as to provide a shoulder 18 and a spigot or shank 19 of reduced diameter which is press-fitted or bonded in the top of the bore 15 of the nipple body part. The shoulder 18 fits upon the top surface of the nipple flange 1F.

In the construction shown in Figure 7, the teat is provided with a straight-through hole 9G of no measurable diameter arranged centrally in the shank as in the constructions shown in Figures 1, 3 and 5. In the construction shown in Figure 8, however, the teat is formed with a central recess 21 and a small hole 9F of no measurable diameter as in the construction shown in Figure 2. In this construction, the teat is press-fitted in or bonded to the nipple body part.

In all the above described constructions the nozzle-engaging head of the teat is unsupported at its peripheral edge part against the thrust of the grease gun nozzle.

In the ninth to sixteenth constructions, shown in Figures 9 to 16, however, the nozzle-engaging head 23 of each teat is supported at its edges by means of an integral downturned peripheral flange or rim 24. The base of this flange or rim rests upon the top surface of the flange 1G of the nipple body part and, as shown by the arrows in the figures, the pressure of the grease gun nozzle is applied to the head flange at substantially half the radius of the flange, i. e., at a point where it is unsupported.

From an inspection of the drawings it will be seen that in other respects the teats shown in Figures 9 to 16 correspond to the teats shown in Figures 1 to 8 and that the nipple body parts shown in Figures 9 to 16 correspond respectively to those shown in Figures 1 to 8.

On other constructions the teat itself may form the complete nipple, which thereby becomes resilient, the metal or other rigid body part then being eliminated. Thus, in the seventeenth to twenty fourth constructions which are shown in Figures 17 to 24, the resilient nipples 25 (i. e., the combined teat and nipple body) are constructed respectively substantially like the teats of the first to sixth constructions shown in Figures 1 to 6, except that on each nipple there is a supporting annular flange 26 spaced axially from the head 27. The resilient nipples are fitted in holes formed in the bearings or other parts to be lubricated, these holes being either threaded as shown at 50 in Figures 23 and 24, or counterbored as shown at 28 in Figures 17 to 20, or plain cylindrical as shown at 29 in Figures 21 and 22. The base of the annular flange 26 of each resilient nipple is seated upon the outer surface 61 of the bearing or other part to be lubricated.

In the twenty fifth to thirty-second constructions which are shown in Figures 25 to 32, the teats themselves again form the resilient nipples but they do not comprise annular flanges 26 and their heads are constructed like those of the teats of the constructions shown in Figures 9 to 16 having their outer edges supported by annular flanges 29 seated upon the top surfaces 30 of the bearings or other parts to be lubricated similar to those in Figures 9 to 16. The method of mounting the nipples in holes in the bearings, or other parts to be lubricated, are the same as the methods used in the constructions shown in Figures 17 to 24.

Figure 33:
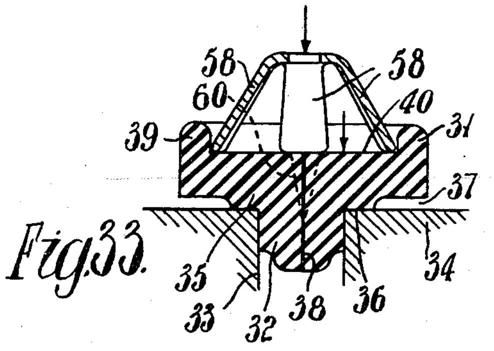
Figure 33 is a sectional view of a resilient closure member or teat which itself forms a nipple adapted to be applied to a bearing or other place of use and which is constructed for use with a nozzle fitted with the flexible spreading device which is also shown in the figure.

In the modification shown in Figure 33, the teat, which forms a resilient nipple, comprises a circular nozzle-engaging head 31 and a cylindrical shank 32 which is of less diameter than the head and is inserted in a cylindrical hole 33 in the bearing 34 or other part to be lubricated. The head is separated from the shank 32 by a waist part 35 and the shoulder 36 between the latter and the shank acts to limit the extent to which the shank can be inserted into the hole 33. When the nipple is in its working position an annular space 37 is left between the top surface of the bearing or other parts to be lubricated and the under surface of the head part 31. The resilient nipple is also formed with an axial lubricant hole 38 of no measurable diameter which is normally closed. The head 31 is also formed with an upstanding, annular rim 39 surrounding the flat outer surface 40 of the nipple.

Figure 34:
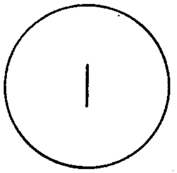
Figures 34 to 36 are plan views of modified closure members or teats in which the lubricant passage is formed by one or more slits.
Figure 35:
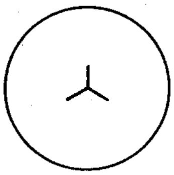

Each of the above constructions has been described as having a central lubricant passage in the form of a hole of no measurable diameter but it will be appreciated that this passage may also take the form of a linear slit as shown in Figure 34 or it may be star-shaped having three or more radial arms, as shown in Figures 35 and 36. In all cases, however, the slits are knife-cut (not sawn) and thus have no measurable width.

Any type of nozzle may be used in association with the nipples provided by this invention as long as it comprises means for applying the requisite thrust to the outer surface of the nozzle-engaging head of the teat required to spread the outer end of the normally closed lubricant passage, and a nozzle or injector device having a pointed end adapted to enter the opened end of the said passage.

Figures 37 and 38 each show a nozzle suitable for use with any of the nipples shown in Figures 1 to 32, each nozzle, however, being shown in its working position upon a nipple constructed as shown in Figure 1.

The nozzle shown in Figure 37 is similar to that in Figure 8 of my co-pending application No. 741,361, filed on April 14, 1947. Thus, the nozzle comprises an injector member 41 formed with a pointed end 42 which is adapted to enter the end of the lubricant passage 9 in the closure member or teat when the end is spread in the manner described below. A tubular sleeve 43 which is formed with a cup-shaped extension 44 having a depending rim part 45, is slidably arranged upon a machined cylindrical part 46 of the injector member and is constantly pressed downwards by a coil spring 47. When, as shown in the figure, the nozzle is arranged in its working position on the nipple, the rim 45 fits over the flange 1 of the nipple body and thus acts to ensure that the pointed end 42 of the injector member is axially aligned with the passage 9 in the closure member or teat.

When manual pressure is applied to the grease gun (not shown) the lower end 43A of the sleeve 43 first thrusts downwards upon the head 6 deflecting it downwards as shown in dotted lines and thus causing the upper end of the passage 9 to spread and open. Continued manual pressure upon the grease gun causes the injector member to slide downwards relative to the sleeve and the pointed end 42 to enter the opened end of the passage 9 and grease to be injected into the latter under pressure.

The modified nozzle shown in Figure 38 again comprises a hollow injector member 48 having a pointed end 49, a guide shank 50 which is slidably guided in the bore of the tubular part 51 of the nozzle and a piston part 50*a*, slidably guided in a tubular sleeve 52 which is screwed upon the threaded end of the tubular part 51 and is integral with a channelled lower part formed with an inner rim 53 and an outer and longer rim 54. A coil spring 55 fitted within the sleeve 52 acts to thrust the injector member 48 upwardly. The shank 50 is formed with a number of ports 56 which provide communication between the interior of the injector member and the annular space 57 formed between the shank and the sleeve 52 above the piston 50*a*.

When the nozzle is arranged in its working position upon the nipple as shown in Figure 38, the rim 54 fits around the flange 1 of the nipple body part and thus serves to ensure that the pointed end 49 is axially aligned with the passage 9. When the grease gun (not shown) is thrust towards the nipple, the rim 53 exerts vertical pressure upon the head 6 of the closure member or teat deflecting it downwards and outwards as shown by the dotted lines thus spreading the material and opening the upper end of the passage 9. When the grease gun is operated to put the grease under pressure grease flows through the ports 56 into the annular space 57 where, acting upon the piston 50*a*, it forces the latter downwards and thrusts the pointed end 49 of the injector member into the opened end of the passage 9 against the thrust of the spring 55, grease then being injected from the injector member into the said passage.

Figure 39 shows a nozzle of the same type as that shown in Figure 37 applied to a nipple having a head supported at the edges as shown in Figures 9 to 16 and 25 to 32. It will be seen that in this case the lower end 43*a* of the tubular member 43 engages the head of the nipple at a point about halfway between the centre of the rim, that is, at a point where it is unsupported. When the vertical thrust is applied as previously described, the head is deflected downwards as shown by the dotted lines thus stretching the material radially and opening the upper end of the passage.

It will be appreciated that a nozzle as shown in Figure 38 will similarly operate in conjunction with a nipple of this type.

A spreading device adapted to be fitted to a nozzle suitable for use with the nipple shown in Figure 33 is shown in that figure. The end of the nozzle (not shown) is fitted with a small conical, star-shaped flexible spreader having radial arms 58, the tips of which fit in the junction of the inner surface of the rim 39 and the flat surface 40. Thus, when pressure is applied by the grease gun nozzle to the spreader in the direction shown by the arrow, the arms 58 spread apart, stretching the rim 39 and thus pulling the mouth of the lubricant passage 38 open as indicated by the broken lines 60.

It will be appreciated that any of the closure members or teats shown in Figures 1 to 8 and 17 to 24 may be constructed for use with nozzles having spreading devices like that shown in Figure 33 by providing the closure member or teat with a peripheral rim like the rim 39 in Figure 33.

I claim:

1. A closure member for closing a lubricant receiving passageway comprising a unitary body member of circular cross section throughout its length formed from resilient fluid impervious deformable material and having an opening extending axially from end to end thereof at least the outer portion of which is a pierced opening which is closed in the relaxed condition of the closure member, said body member having an annular flange on one end of appreciably larger diameter than the outer end of said passageway and relatively thin in axial dimensions, and a supporting shank integral therewith and axially disposed relative thereto extending from one side of the flange, said shank conforming in shape at least along its end remote from the flange, substantially to the shape of the outer end portion of the passageway to adapt the said end of the shank to be snugly received therein for anchoring the closure member with said flange wholly outside the outer end of said passageway and at least a portion of the flange which extends radially outwardly of said shank held free of subjacent support radially of the outer end of the passageway so that the said flange will be deformed to cause the pierced opening to be enlarged radially upon the application of pressure on said flange in the direction of the shank and radially outwardly of the opening.

2. A closure member for closing a lubricant receiving passageway comprising a unitary body member of resilient fluid impervious deformable material having an opening extending axially from end to end thereof at least the outer portion of which is a pierced opening which is closed in the relaxed condition of the closure member, said body member including a disc-like outer end part of appreciably larger diameter than the outer end of said passageway and relatively thin in axial dimensions and an inner end part of smaller diameter integral therewith and extending axially therefrom, said inner end part conforming in shape at least along its end remote from the outer end part substantially to the shape of the outer end portion of the passageway to adapt the said end of the closure member to be snugly received therein for anchoring the closure member in axially disposed relation relative to the passageway and with the said outer end part wholly outside the outer end of said passageway and at least a portion of the under side of the said outer end part held in axially spaced relation to the structure in which said passageway is formed so that the said outer end part will be deformed to cause the pierced opening to be enlarged radially upon the application of pressure on said outer end part in the direction of the inner end part and radially outwardly of the opening.

3. A closure member for closing a lubricant receiving passageway comprising a unitary body member of resilient fluid impervious deformable material having an opening extending axially from end to end thereof at least the outer portion of which is a pierced opening which is closed in the relaxed condition of the closure member, said body member including a disc-shaped outer end part of appreciably larger diameter than the outer end of said passageway and relatively thin in axial dimensions, and a second part integral with said outer end part and extending axially therefrom forming at least one shoulder on said body member to engage the outer side of the structure in which said passageway is formed and including a portion conforming in shape to the outer end portion of the passageway and snugly receivable therein for anchoring the closure member in axially disposed relation relative thereto with said outer end part wholly outside the outer end of said passageway and at least a portion of said outer end part which extends radially outwardly of the second part of the closure member spaced axially outwardly of the structure in which said passageway is formed.

4. A closure member for closing a lubricant receiving passageway comprising a unitary body member of resilient fluid impervious deformable material having an opening extending axially from end to end thereof at least the outer portion of which is a pierced opening which is closed in the relaxed condition of the closure member, said body member including a disc-like first end part of appreciably larger diameter than the outer end of said passageway and relatively thin in axial dimensions, an intermediate part of smaller diameter integral at one end with the first end part and extending axially therefrom and a second end part adjacent the other end of said intermediate part and integral therewith providing a shoulder adapted to engage a complementary shoulder in the passageway for anchoring the closure member therein with said first end part supported wholly outside of the outer end of said passageway and with at least a portion of said first end part which is disposed radially outwardly of the intermediate part spaced axially outwardly of the confronting face of the structure in which said passageway is formed.

5. A closure member for closing a lubricant receiving passageway comprising a unitary body member of resilient fluid impervious deformable material having an opening extending axially from end to end thereof at least the outer portion of which is a pierced opening which is closed in the relaxed condition of the closure member, said body member including a disc-like first end part of appreciably larger diameter than the outer end of said passageway and relatively thin in axial dimensions, an intermediate part of smaller diameter integral at one end with the first end part and extending axially therefrom and a second end part integral with the other end of said intermediate part providing a projecting shoulder adapted to engage a complementary shoulder in the passageway for anchoring the closure member in axially disposed relation relative thereto, said intermediate part being of sufficient length to support said first end part wholly outside of the outer end of said passageway with the under side thereof spaced axially outwardly of the plane of the outer end of said passageway.

6. A closure member for closing a lubricant receiving passageway comprising a unitary body member of resilient fluid impervious deformable material having an opening extending axially from end to end thereof at least the outer portion of which is a pierced opening which is closed in the relaxed condition of the closure member, said body member including a disc-shaped first end part of a diameter appreciably larger than the diameter of the outer end of said passageway, an intermediate part of a diameter intermediate the diameter of said passageway and said first end part integral at one end with the latter and extending axially therefrom, and a second end part integral with the opposite end of said intermediate part and conforming in shape substantially to the shape of the outer end of said passageway so as to be snugly receivable therein for anchoring said closure member in axially disposed relation with the passageway, the juncture of said intermediate part and second end part providing a shoulder overlappingly to engage the outer side of the structure in which said passageway is formed for limiting movement of the closure member inwardly of the passageway so that the first end part is supported spaced axially outwardly of the outer end of said passageway the length of said intermediate part.

7. A closure member for closing a lubricant receiving passageway comprising a unitary body member of resilient fluid impervious deformable material having an opening extending axially from end to end thereof at least the outer portion of which is a pierced opening which is closed in the relaxed condition of the closure member, said closure member including a pair of disc shaped flanges both of appreciably larger diameter than the outer end of said passageway axially spaced from each other by an integral part of reduced diameter, one of said flanges forming an outer end part on the closure member and the other flange forming an intermediate stop member, and an inner end part integral with the side of said stop member opposite said outer end part and extending axially therefrom, said inner end part conforming in external contour to the contour of the outer end part of said passageway so as to be receivable therein for anchoring the closure member therein in axially disposed relation thereto with said stop member overlappingly engaged against the outer end of said passageway to limit movement of said closure member inwardly of the passageway.

8. A closure member for closing a lubricant receiving passageway comprising a unitary body member of resilient fluid impervious deformable material having an opening extending axially from end to end thereof at least the outer portion of which is a pierced opening which is closed in the relaxed condition of the closure member, said body member including a pair of disc-shaped flanges both of appreciably larger diameter than the outer end of said passageway axially spaced from each other by an integral part of reduced diameter, one of said flanges forming an outer end part on the closure member and the other flange forming an intermediate stop member, and an inner end part integral with the side of said stop member opposite said outer end part and extending axially therefrom, said inner end part having a portion adjacent said stop member of substantially the same diameter as the outer end of said passageway and a shoulder adjacent its end remote from the stop member to engage a complementary shoulder in said passageway for anchoring the closure member against movement outwardly of the passageway with said stop member overlappingly engaged against the outer end of said passageway to limit movement of said closure member inwardly of the passageway.

9. A plug type closure member for closing a lubricant receiving passageway comprising a unitary body member of circular cross section throughout its length formed from resilient fluid impervious deformable material and having an opening extending axially from end to end thereof at least the outer portion of which is a pierced opening which is closed in the relaxed condition of the closure member, said body member including a disc-like outer end part of appreciably larger diameter than the outer end of said passageway and relatively thin in axial dimensions, a supporting shank of smaller diameter integral therewith and extending axially therefrom, and a peripheral skirt integral with the outer end part and extending therefrom in the same direction as said shank, said shank being conformed in shape at least along its end remote from the outer end part to cooperate with the outer end portion of the passageway for anchoring the closure member with its outer end part wholly outside the outer end of said passageway spaced axially a sufficient distance outwardly from the structure in which said passageway is formed to bring said skirt into light contacting engagement with the outer side of the said structure when said closure member is in relaxed condition so that said outer end part will be deformed to cause the pierced opening to be enlarged radially upon the application of pressure on the said outer end part in the direction of the shank between the juncture of the shank and outer end parts and said skirt.

10. A closure member for closing a lubricant receiving passageway comprising a unitary body member of resilient fluid impervious deformable material having an opening extending axially from end to end thereof at least the outer portion of which is a pierced opening which is closed in relaxed condition of the closure member, said body member including a disc-shaped outer end part of appreciably larger diameter than the outer end of said passageway, a second part integral with said outer end part and extending axially therefrom forming at least one shoulder on said body member to engage the outer side of the structure in which said passageway is formed and including a portion conforming in shape to the outer end portion of the passageway and snugly receivable therein for anchoring the closure member in axially disposed relation relative thereto with said outer end part wholly outside the outer end of said passageway and at least a portion of said outer end part which extends radially outwardly of the second part of the closure member spaced axially outwardly of the structure in which said passageway is formed, and a peripheral skirt integral with said outer end part and extending axially therefrom in the same direction as said second part, said skirt being of sufficient length to rest upon the outer side of the structure in which said passageway is formed when said closure member is in anchored position.

11. A closure member for closing a lubricant receiving passageway comprising a unitary body member of resilient fluid impervious deformable material having an opening extending axially from end to end thereof at least the outer portion of which is a pierced opening which is closed in the relaxed condition of the closure member, said body member including a disc-like first end part of appreciably larger diameter than the outer end of said passageway, an intermediate part of smaller diameter integral at one end with the first end part and extending axially therefrom, a second end part adjacent the other end of said intermediate part and integral therewith providing a shoulder adapted to engage a complementary shoulder in the passageway for anchoring the closure member therein with said first end part supported wholly outside of the outer end of said passageway and with at least a portion of said first end part which is disposed radially outwardly of the intermediate part spaced axially outwardly of the confronting face of the structure in which said passageway is formed, and a peripheral skirt integral with said first end part and extending axially therefrom in the same direction as said intermediate part, said skirt being of sufficient length to rest upon the outer side of the structure in which said passageway is formed when said closure member is in anchored position.

12. A closure member for closing a lubricant receiving passageway comprising a unitary body member of resilient fluid impervious deformable material having an opening extending axially from end to end thereof at least the outer portion of which is a pierced opening which is closed in the relaxed condition of the closure member, said body member including a disc-shaped first end part of a diameter appreciably larger than the diameter of the outer end of said passageway, an intermediate part of a diameter intermediate the diameter of said passageway and said first end part integral at one end with the latter and extending axially therefrom, a second end part integral with the opposite end of said intermediate part and conforming in shape substantially to the shape of the outer end of said passageway so as to be snugly receivable therein for anchoring said closure member in axially disposed relation with the passageway, the juncture of said intermediate part and second end part providing a shoulder to engage the outer side of the structure in which said passageway is formed surrounding the latter to limit movement of the closure member inwardly of the passageway so that the first end part is supported spaced axially outwardly of the outer end of said passageway the length of said intermediate part, and a peripheral skirt integral with said first end part and extending axially therefrom in the same direction as said intermediate part, said skirt being of sufficient length to rest upon the outer side of the structure in which said passageway is formed when said closure member is in anchored position.

13. A plug type closure member for closing a lubricant receiving passageway comprising a unitary body member of circular cross section throughout its length formed from resilient fluid impervious deformable material and having an opening extending axially from end to end thereof at least the outer portion of which is a pierced opening which is closed in the relaxed condition of the closure member, said body member having an annular flange on one end of appreciably larger diameter than the outer end of said passageway and relatively thin in axial dimensions, a supporting shank integral therewith and axially disposed relative to the flange extending from one side thereof, said shank conforming in shape at least along its end remote from the flange substantially to the shape of the outer end portion of the passageway to adapt the said end of the shank to be snugly received therein for anchoring the closure member with the said flange wholly outside the outer end of said passageway and at least a portion of the underside of the said flange held in axially spaced relation to the structure in which said passageway is formed so that the said flange will be deformed to cause the pierced opening to be enlarged radially upon the application of pressure on said flange in the direction of the shank and radially outwardly of the opening, and a peripheral rim integral with said flange extending axially outwardly from the outer side thereof in a direction opposite from the direction of extension of the shank.

14. A closure member for closing a lubricant receiving passageway comprising a unitary body member of resilient fluid impervious deformable material having an opening extending axially from end to end thereof at least the outer portion of which is a pierced opening which is closed in the relaxed condition of the closure member, said body member including a disc-shaped first end part of a diameter appreciably larger than the diameter of the outer end of said passageway, an intermediate part of a diameter intermediate the diameter of said passageway and said first end part integral at one end with the latter and extending axially therefrom, a supporting shank integral with the opposite end of said intermediate part and conforming in shape substantially to the shape of the outer end of said passageway so as to be snugly receivable therein for anchoring said closure member in axially disposed relation with the passageway, the juncture of said intermediate part and shank providing a shoulder overlappingly to engage the outer side of the structure in which said passageway is formed for limiting movement of the closure member inwardly relative to the passageway so that the first end part is supported spaced axially outwardly of the outer end of said passageway the length of said intermediate part, and a peripheral flange integral with said first end part extending axially outwardly from the outer side thereof in a direction opposite from the direction of extension of the intermediate part.

15. A closure member for closing a lubricant receiving passageway comprising a unitary body member of resilient fluid impervious deformable material having an opening extending axially from end to end thereof at least the outer portion of which is a pierced opening which is closed in the relaxed condition of the closure member, said body member including a disc-shaped outer end part of appreciably larger diameter than the outer end of said passageway, a second part integral with said outer end part and extending axially therefrom forming at least one shoulder on said body member to engage the outer side of the structure in which said passageway is formed and including a portion conforming in shape to the outer end portion of the passageway and snugly receivable therein for anchoring the closure member in axially disposed relation relative thereto with said outer end part wholly outside the outer end of said passageway and at least a portion of said outer end part which extends radially outwardly of the second part of the closure member spaced axially outwardly of the structure in which said passageway is formed, and a peripheral flange integral with said outer end part extending axially outwardly from the outer side thereof in a direction opposite from the direction of extension of the second part.

16. A closure member for closing a lubricant receiving passageway comprising a unitary body member of resilient fluid impervious deformable material having an opening extending axially from end to end thereof at least the outer portion of which is a pierced opening which is closed in the relaxed condition of the closure member, said body member including a pair of disc-shaped flanges both of appreciably larger diameter than the outer end of said passageway axially spaced from each other by an integral part of reduced diameter, one of said flanges forming an outer end part on the closure member and the other flange forming an intermediate stop member, a supporting shank integral with the side of said stop member opposite said outer end part and extending axially therefrom, said shank having a portion adjacent said stop member of substantially the same diameter as the outer end of said passageway and a shoulder adjacent its end remote from the stop member to engage a complementary shoulder in said passageway for anchoring the closure member against movement outwardly of the passageway with said stop flange overlappingly engaged against the structure in which said passageway is formed for limiting movement of said closure member inwardly of the passageway, and a peripheral flange integral with said outer end part extending axially outwardly from the side thereof opposite said stop member.

17. A closure member for closing a lubricant receiving passageway comprising a unitary body member of resilient fluid impervious deformable material having an opening extending axially from end to end thereof at least the outer portion of which is a pierced opening which is closed in the relaxed condition of the closure member, said body member including a disc-like first end part of appreciably larger diameter than the outer end of said passageway, an intermediate part integral at one end with the first end part and extending axially therefrom, at least a portion of which is of smaller diameter than said outer end part, and a shank integral with the other end of said intermediate part of smaller diameter than said intermediate part and conforming substantially to the diameter of the outer end of said passageway to adapt said shank to be received in said passageway and providing an annular shoulder spaced from the said outer end part, said shank having peripheral threads to engage complementary threads in the outer end of said passageway for anchoring said closure member with said shoulder overlapping the outer edges of said passageway so that said outer end part is supported wholly outside said passageway with at least portions thereof spaced axially outwardly of the end of the passageway.

CAMILLE CLARE SPRANKLING LE CLAIR.

REFERENCES CITED

The following references are of record in the file of this patent:

UNITED STATES PATENTS

| Number | Name | Date |
|---|---|---|
| 120,693 | Wood | Nov. 7, 1871 |
| 660,894 | Ernst | Oct. 30, 1900 |
| 2,234,238 | Forsberg | Mar. 11, 1941 |